United States Patent
Li et al.

(10) Patent No.: US 12,548,554 B2
(45) Date of Patent: Feb. 10, 2026

(54) SYSTEM AND METHOD FOR ACTIVE LEARNING BASED MULTILINGUAL SEMANTIC PARSER

(71) Applicant: Openstream Inc., Somerset, NJ (US)

(72) Inventors: Zhuang Li, Glen Waverley (AU); Ghlolamreza Haffari, Wheelers Hill (AU); Rajasekhar Tumuluri, Bridgewater, NJ (US); Philp R. Cohen, Deer Harbor, WA (US)

(73) Assignee: Openstream Inc., Bridgewater, NJ (US)

( * ) Notice: Subject to any disclaimer, the term of this patent is extended or adjusted under 35 U.S.C. 154(b) by 443 days.

(21) Appl. No.: 18/318,225

(22) Filed: May 16, 2023

(65) Prior Publication Data
US 2024/0185838 A1    Jun. 6, 2024

Related U.S. Application Data

(60) Provisional application No. 63/430,469, filed on Dec. 6, 2022.

(51) Int. Cl.
*G10L 15/06*    (2013.01)
*G10L 15/18*    (2013.01)

(52) U.S. Cl.
CPC ........ *G10L 15/063* (2013.01); *G10L 15/1822* (2013.01); *G10L 2015/0635* (2013.01)

(58) Field of Classification Search
CPC .............. G10L 15/063; G10L 15/1822; G10L 2015/0635
See application file for complete search history.

(56) References Cited

U.S. PATENT DOCUMENTS 10,460,036 B2    10/2019  Duong et al.
2009/0063145 A1*  3/2009  Hakkani-Tur ...... G10L 15/1822
                                    704/E15.001
(Continued)

OTHER PUBLICATIONS

Xia et al., "Multilingual Neural Semantic Parsing for Low-Resourced Languages", Proceedings of the 10th Conference on Lexical and Computational Semantics, pp. 185-194, Aug. 5-6, 2021, Retrieved from Internet URL: https://aclanthology.org/2021.starsem-1.17/.

*Primary Examiner* — Bhavesh M Mehta
*Assistant Examiner* — Edward Tracy, Jr.
(74) *Attorney, Agent, or Firm* — Young Basile Hanlon & MacFarlane, P.C.

(57) ABSTRACT

Described is a system and method for training a multilingual semantic parser. A method includes receiving, by a multilingual semantic parser, a multilingual training dataset, wherein the multilingual training dataset includes pairs of utterances and meaning representations from at least one high-resource language and at least one low-resource language and wherein the multilingual training dataset is initially a machine-translated dataset, training, the multilingual semantic parser, by translating the utterances in the multilingual training dataset to a target language; and iteratively performing selecting, by an acquisition functions estimator, a subset of the multilingual training dataset for human translation, updating the multilingual training dataset with the human-translated subset of the multilingual training dataset with, and retraining, the multilingual semantic parser, with the updated multilingual training dataset.

22 Claims, 5 Drawing Sheets

(56) References Cited

U.S. PATENT DOCUMENTS

2023/0186035 A1\* 6/2023 Lee .................... G10L 21/0208
704/2
2023/0289538 A1\* 9/2023 Goel ....................... G06F 40/58

\* cited by examiner

SYSTEM AND METHOD FOR ACTIVE LEARNING BASED MULTILINGUAL SEMANTIC PARSER

CROSS-REFERENCE TO RELATED APPLICATION(S)

This application claims priority to and the benefit of U.S. Provisional Patent Application Ser. No. 63/430,469, filed Dec. 6, 2022, the entire disclosure of which is hereby incorporated by reference.

FIELD OF INVENTION

This disclosure relates to natural language processing, and more particularly to a system and method for multilingual semantic parser providing improved trained model over one or more high and low resources language utterances.

BACKGROUND

Multilingual semantic parsing allows a single model to convert natural language utterances from multiple languages into logical forms (LFs). A variety of applications, such as multilingual question answering and multilingual virtual assistants, employ multilingual semantic parsers. Training a multilingual semantic parser (MSP) requires training data from all target languages. However, there is a severe imbalance of data availability among languages, particularly in low-resource languages. The utterances in most current semantic parsing datasets are in English, which is a high-resource language, while non-English data is scarce.

Two annotation strategies for training the MSP are human translation (HT) and automatic or machine translation (MT). To reduce the annotation cost, the training data $D_{lT} \in D_L$ for multilingual parsers is usually generated by translating the $D_{ls}$ in a source language $l_s$ into the target language $l_T$ by the automatic translation services or human translators instead of directly collecting <Utterance, Logical Form> pairs in the target languages.

To overcome the data imbalance issue, state-of-the-art MSPs translate utterances in the MSP datasets from high-resource languages (e.g., English) to the target low-resource languages of interest by either HT or MT. Unfortunately, HT, though effective, is cost-intensive and time-consuming. While the cost of MTs is much lower than that of HTs, the low quality of the machine-translated utterances severely weakens the performance of the MSPs in the target languages.

The quality of MTs is lower than that of HTs, mainly due to the generation of translations with errors and are likely to be influenced by algorithmic bias. Hence, the output of MT systems is generally less lexically and morphologically diverse than human translations. So, there is a lexical distribution discrepancy between the machine-translated and the human-generated utterances.

SUMMARY

In an aspect, a system and method for training a multilingual semantic parser is disclosed. A method includes receiving, by a multilingual semantic parser, a multilingual training dataset, wherein the multilingual training dataset includes pairs of utterances and meaning representations from at least one high-resource language and at least one low-resource language and wherein the multilingual training dataset is initially a machine-translated dataset, training, the multilingual semantic parser, by translating the utterances in the multilingual training dataset to a target language; and iteratively performing selecting, by an acquisition functions estimator, a subset of the multilingual training dataset for human translation, updating the multilingual training dataset with the human-translated subset of the multilingual training dataset with, and retraining, the multilingual semantic parser, with the updated multilingual training dataset.

BRIEF DESCRIPTION OF DRAWINGS

The various embodiments of the disclosure will hereinafter be described in conjunction with the appended drawings, provided to illustrate, and not to limit, the disclosure, wherein like designations denote like elements, and in which.

Figure 1:
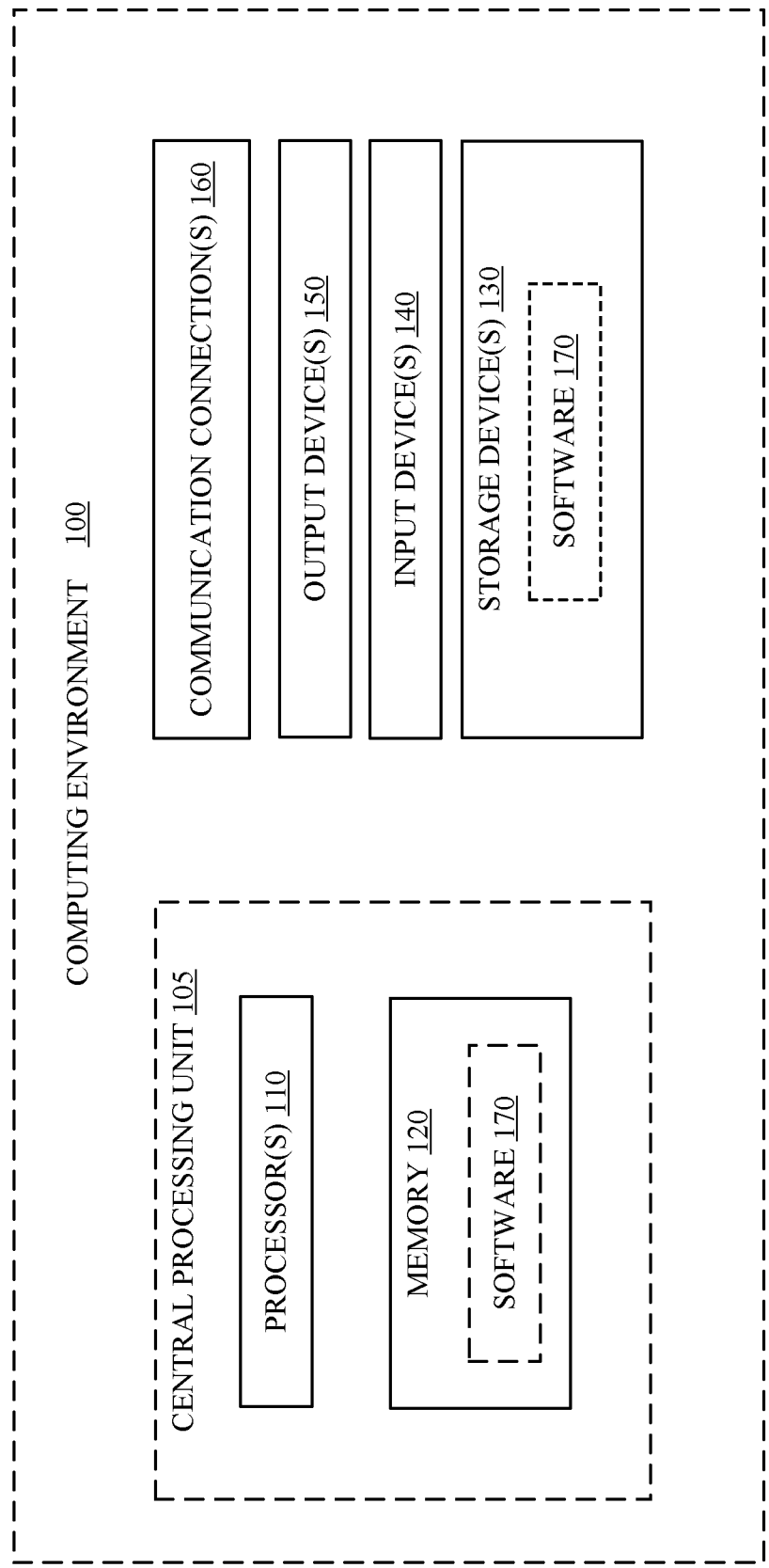
FIG. 1 is a block diagram of an example of a computing environment for a multilingual semantic parser in accordance with embodiments of this disclosure.

While systems and methods are described herein by way of examples and embodiments, those skilled in the art recognize that systems and methods for multilingual semantic parser are not limited to the embodiments or drawings described. It should be understood that the drawings and description are not intended to be limiting to the particular form disclosed. Rather, the intention is to cover all modifications, equivalents, and alternatives falling within the spirit and scope of the appended claims. Any headings used herein are for organizational purposes only and are not meant to limit the scope of the description or the claims. As used herein, the word "may is used in a permissive sense (i.e., meaning having the potential to) rather than the mandatory sense (i.e., meaning must). Similarly, the words "include", "including, and "includes' mean including, but not limited to.

DETAILED DESCRIPTION

Disclosed embodiments and/or implementations provide computer-implemented methods, systems, and computer-readable media for leveraging multilingual data by a multilingual semantic parser. The embodiments and/or implementations described herein are related to training the multilingual semantic parser. While the particular embodiments and/or implementations described herein may illustrate the invention in a particular domain, the broad principles behind these embodiments and/or implementations are applicable to other fields of endeavor. To facilitate a clear understanding of the present disclosure, illustrative examples are provided herein which describe certain aspects of the disclosure. However, it is to be appreciated that these illustrations are not meant to limit the scope of the disclosure, and are provided herein to illustrate certain concepts associated with the disclosure.

It is also to be understood that the present disclosure may be implemented in various forms, including but not limited to, hardware, software, firmware, special purpose processors, and/or combinations thereof. In implementations, the present invention is implemented in software as a program tangibly embodied on a program storage device. The program may be uploaded to, and executed by, a machine comprising any suitable architecture.

As used herein, the terminology "server", "computer", "computing device or platform", or "cloud computing system or platform" includes any unit, or combination of units, capable of performing any method, or any portion or portions thereof, disclosed herein. For example, the "server", "computer", "computing device or platform", or "cloud computing system or platform" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, travel scheduling and management, smart home management, entertainment, installation parameters and alignment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

A system and method for semantic parsing of multilingual utterances in a multimodal conversational system is disclosed which leverages the knowledge from high-resource languages to improve low-resource language semantic parsing. The method implements an active learning approach that exploits the strengths of both human translations and the machine translations by iteratively adding small batches of human translations into a machine-translated training set. The method computes one or more acquisition functions to select high-resource language utterances for human translation. In implementations, an utterance selection criterion in accordance with defined acquisition functions is provided. The system improves a multilingual semantic parser by significantly reducing the error and bias in the translated data from multilingual semantic parsing during training of the multilingual semantic parser.

In implementations, the system includes a method for intelligently selecting a small portion of human-translated data into a complete set of machine-translated training data to improve a multilingual semantic parser performance significantly on a test set of the target language. In implementations, an annotation strategy or method based on active learning (AL) is used that benefits from both human translations and automatic machine translations (HAT). The system initially machine-translates all utterances in training sets from one or more high-resource languages to target languages. Then, for each iteration, HAT selects a subset of utterances from the original training set to be translated by human translators, followed by adding the human translated data to the machine translated training data. The multilingual semantic parser is trained on the combination of both types of translated data. The HAT can select utterances whose human translations maximally benefit the parser performance.

Resolving the bias and error issues for the translations of the most semantically diversified and representative utterances improves the multilingual semantic parser performance to the greatest extent. In implementations, the system provides an Aggregated acquisition function that scores the utterances on how much their human translations can mitigate the Bias and Error issues for training or learning the multilingual semantic parsers (ABE). In implementations, the method aggregates four individual acquisition functions, where two acquisition functions measure the error and bias degree for the translations of the source utterances and two acquisition functions encourage the selection of the most representative and semantically diversified utterances.

FIG. 1 is a block diagram of an example of a computing environment 100 for a multilingual semantic parser in accordance with embodiments of this disclosure. The computing environment 100 can include a central processing unit 105, a computer-readable or processor-readable storage medium 130, an input device 140, an output device 150, and one or more communication connection(s) 160. The central processing unit 105 can include one or more processor(s) 110, designed to process instructions, and a memory 120. The processor-readable storage medium 130, the input device 140, the output device 150, and the one or more communication connection(s) 160 are in operable communication with the processing unit 110. The computing environment runs a software 170, which is stored on the computer-readable storage medium 130 and the memory 120, as appropriate and applicable. The software 170 can consist of one or more programming instructions stored in the processor-readable storage medium 130 and the memory 120, as appropriate and applicable. The programming instructions are suitable for semantic parsing of multilingual data in accordance with one or more described embodiments and/or implementations.

Figure 2:
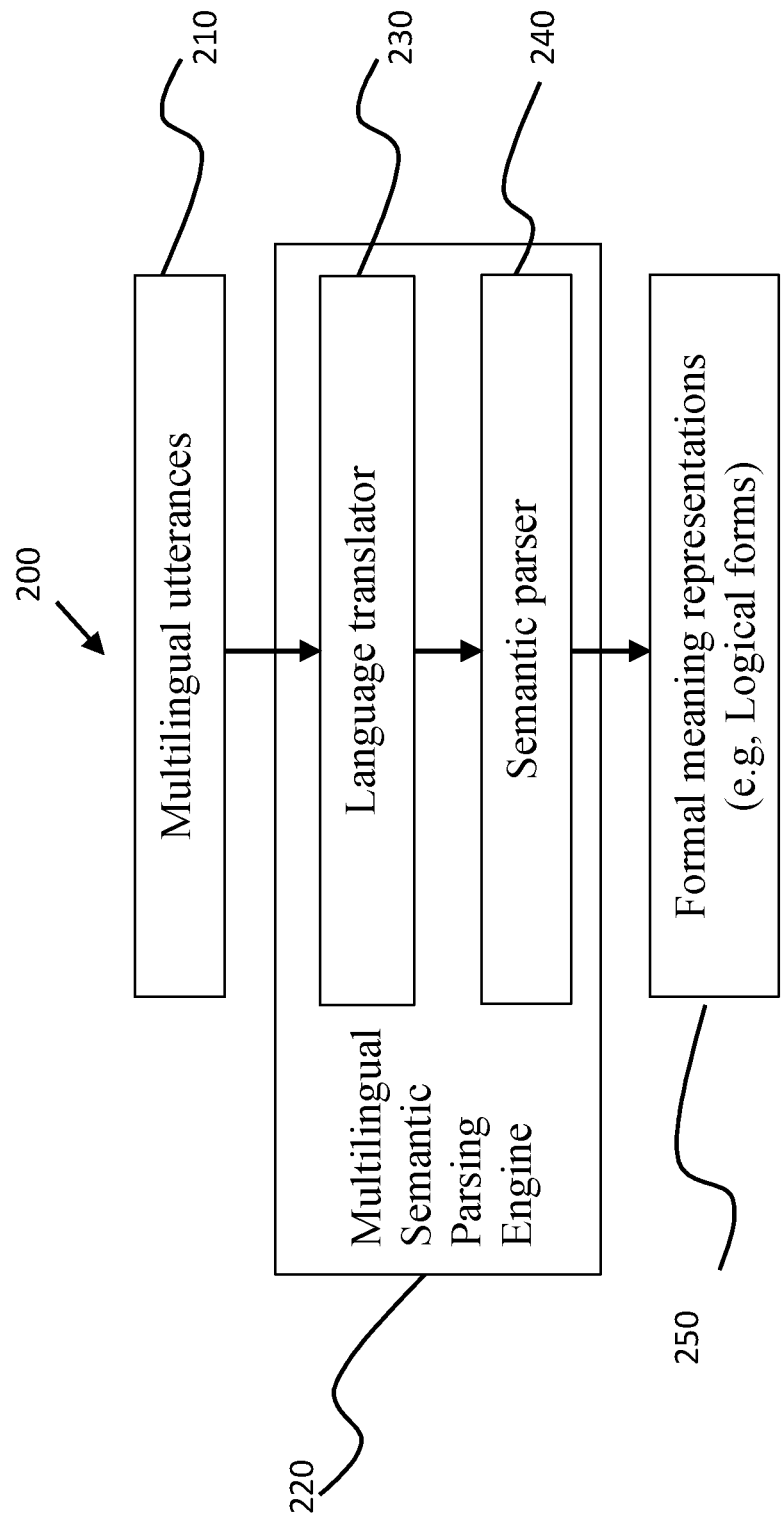
FIG. 2 is a block diagram of an example of a multilingual semantic parsing system for translating and semantic parsing multilingual utterances in accordance with embodiments of this disclosure.

FIG. 2 is a block diagram of an example of a multilingual semantic parsing system 200 for translating and semantic parsing multilingual utterances in accordance with embodiments of this disclosure. The multilingual semantic parsing system 200 includes a multilingual semantic parser engine 220. The multilingual semantic parser engine 220 includes a multilingual language translator 230 and a multilingual semantic parser 240. Inputs to the multilingual semantic parsing system 200 are multilingual utterances 210. The multilingual semantic parsing system 200 generates and outputs formal meaning representations 250. The formal meaning representations 250 can be represented in one or more forms that can be processed by downstream applications. A logical form is an example of a formal meaning representation 250.

The multilingual semantic parser 240 is a parametric model $P_\theta$ (y|x) that maps a multilingual (natural language) utterance 210 $x \in X$ into a formal meaning representation 250 $y \in Y$, where $X = \cup_{l \in L} X_l$ includes utterances in different languages L. The standard training objective for a multilingual parser is:

$$\arg\max_\theta \prod\nolimits_{x,y \in D_L} P_\theta(y|x) \qquad \text{Equation (1)}$$

where $D_L = \cup_{l \in L} D_l$ includes training data where utterances are from multiple languages L.

The multilingual language translator 230 automatically translates, also known as "machine translation (MT)", the source language utterances into target language utterances. The target language utterances are processed by the multilingual semantic parser 240 to produce the formal meaning representation(s) 250.

The main issues with machine translation data are Translation Bias and Translation Errors. Existing machine translation systems amplify biases observed in the training data. This leads to two problems that degrade the parsers' performance trained on machine translation data: (i) the machine translations lack lexical diversity, and (ii) the lexical distribution of the biased machine translations is different from the human-generated test set. On the other hand, translation errors cause incongruence between the source and target texts. For instance, a mistranslation error occurs when the semantics of the source sentences alters after translation. Training a multilingual semantic parser on the mistranslated data would cause the incorrect parsing output as logical forms are the semantic abstraction of the utterances. Machine translation systems sometimes fail to translate phrases to the target languages.

The described method discloses active learning based Human translations and Automatic machine Translations (HAT), which mitigates the negative effect of translation bias and translation error in the machine translation data. HAT introduces extra human supervision to machine supervision when training multilingual semantic parsers. Adding the HTs to the training data enriches its lexical and morphological diversity and ensures that the lexical distribution of the training data is closer to the human test set. This in turn improves the multilingual semantic parsers' generalization ability. Since HTs are less erroneous than the machine translations, the multilingual semantic parser learns with less erroneous training data and predicts correct abstractions.

Figure 3:
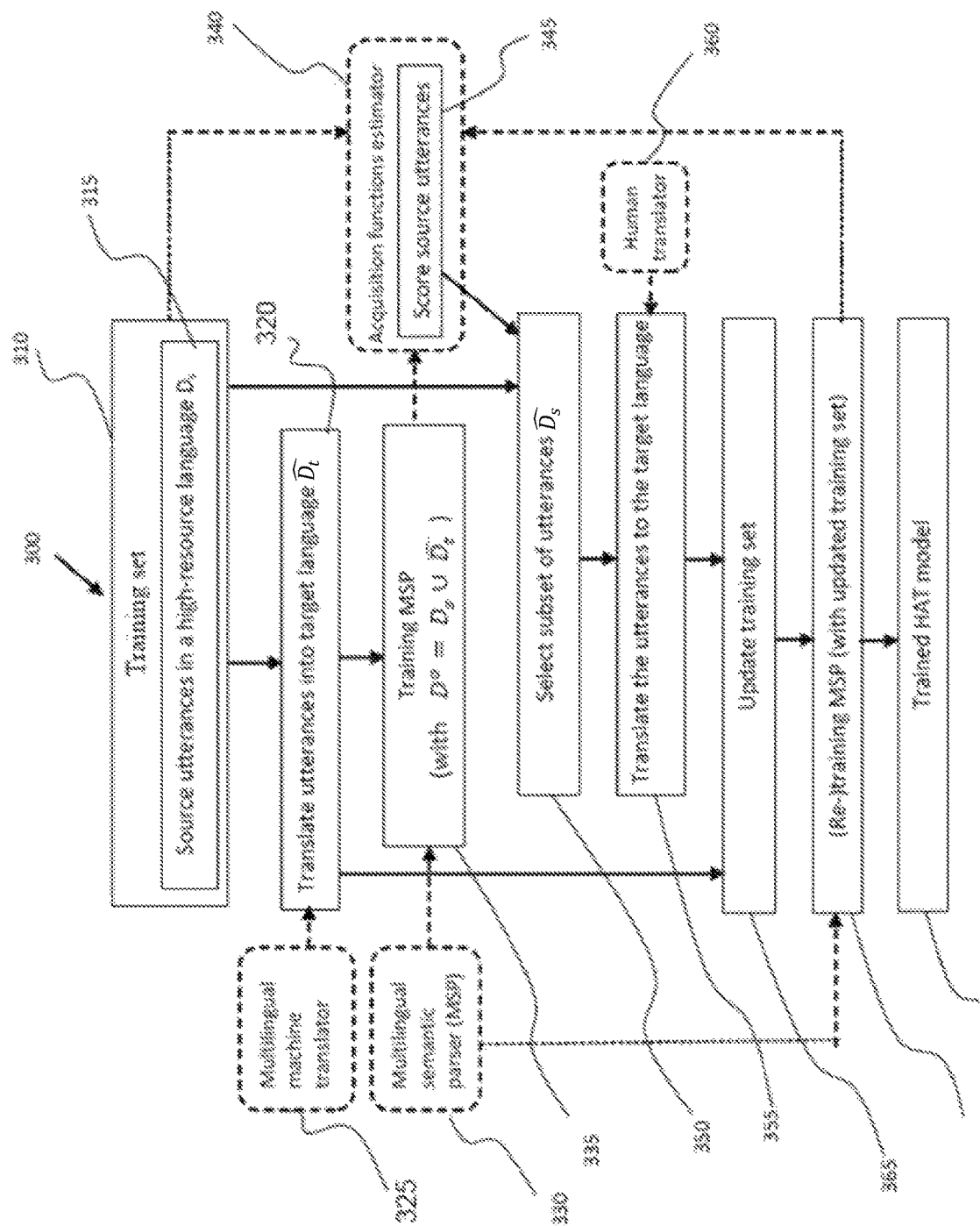
FIG. 3 is a schematic flow diagram of an example computer system for training a multilingual semantic parser in accordance with embodiments of this disclosure.

Reference is now also made to FIG. 3, which is a schematic flow diagram of an example computer system for training a multilingual semantic parser in accordance with embodiments of this disclosure. FIG. 3 depicts a schematic diagram of a HAT system 300. The HAT system 300 uses the methods described in FIG. 4 and FIG. 5. The HAT system 300 includes a multilingual machine translator 325 ($g^{mt}(.)$), a multilingual semantic parser 330, an acquisition functions estimator 340, and a human translator 360. In the HAT system 300, a semantic parsing training set 310 may be stored, for example, in a processor-readable storage medium, such as for example the computer-readable or processor-readable storage medium 130 shown in FIG. 1. The semantic parsing training set 310 comprises source utterances in high-resource languages 315. In some implementations, the multilingual utterance set includes source utterances from a plurality of high-resource and low-resource languages 315.

The presented active learning HAT approach considers two or more languages, at least one of which is a high-resource language and another one is a low-resource language.

The semantic parsing training set 310 can include source utterances in a high-resource language 315 $l_s$ paired with logical forms (LFs):

$$D_s = \{(x_s^i, y^i)\}_{i=1}^{N} \qquad \text{Equation (2)}$$

Consider two human-generated test sets, one is in high-resource language:

$$T_s = \{(x_s^i, y^i)\}_{i=1}^{M} \qquad \text{Equation (3)}$$

and the second one is in low-resource language:

$$T_l = \{(x_l^i, y^i)\}_{i=1}^{M} \qquad \text{Equation (4)}$$

Next, translate source utterances into a target language 320 using the multilingual machine translator 325. Each utterance $x_s$ in $D_s$ is translated into the utterance $\hat{x}_t = g_{s \to t}^{mt}(x_s)$ in the target language $l_t$ by the multilingual machine translator 325 or machine translation system:

$$\widehat{D_t} = \{(\hat{x}_t^i, y^i)\}_{i=1}^{N} \qquad \text{Equation (5)}$$

The multilingual semantic parser 330 undergoes initial training using a combination of source data and the machine translated data:

$$D^o \beta D_s \cup \widehat{D_t} \qquad \text{Equation (6)}$$

The object of the presented active learning HAT method is to select a small subset of utterances 350 from the training data (e.g., semantic parsing training set 310) in the source language, $\widehat{D_s} \in D_s$, and translate the utterances in $\widehat{D_s}$ to the target language 355 by the human translators 360, $D_t = g_{s \to t}^{ht}(\widehat{D_s})$. The selection criterion is based on the acquisition functions estimator 340, which scores source utterances 345 in or from the training set 310. In the presented active learning HAT method, there are Q rounds of selection as described herein with respect to the FIG. 5.

The acquisition functions estimator 340 can include one or more acquisition functions. The acquisition functions in the acquisition functions estimator 340 and/or the acquisition functions estimator 340 assign higher scores to those utterances whose human translations can boost the multilingual semantic parsers 330 performance more than the human translations of other utterances. The most representative and diversified examples in the training set 315 improve the generalization ability of the multilingual semantic parser 330. The hypothesis is that select the representative and diversified utterances in the training set, whose current translations have significant bias and errors.

Figure 4:
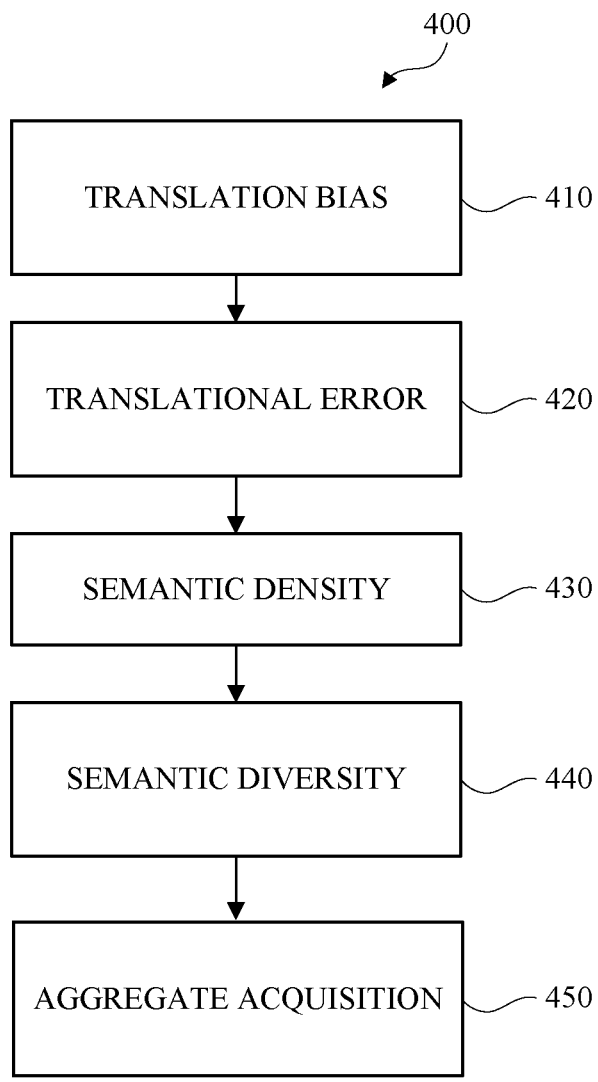
FIG. 4 is a flow chart of ABE method that estimates an aggregate acquisition function value in accordance with embodiments of this disclosure.

FIG. 4 is a flow chart of an ABE method 400 that estimates an aggregate acquisition function value in accordance with embodiments of this disclosure. The acquisition functions estimator 340 can use the ABE method 400 to compute aggregate acquisition values to score the source utterances 345 in high-resource language 315 in the training set 310. The ABE method 400 can include one or more acquisition functions, such as but not limited to, a translation bias acquisition function 410, a translation error acquisition function 420, a semantic density acquisition function 430, and a semantic diversity acquisition function 440 to score the utterances. The ABE method 400 aggregates 450 these acquisition functions to gain their joint benefits. As described herein, each of the four acquisition functions are estimated in each round of the Q rounds. n each active learning (AL) round, the utterances with the highest ABE scores are selected for the human translator 350.

With respect to the translation bias acquisition function 410, assume an empirical conditional distribution, $P_e^q(x_t|x_s)$, for each utterance $x_s$ in $D_s$ at $q^{th}$ AL selection round. The empirical conditional distribution is considered as a mixture of distributions from the human $P_{ht}(x_t|x_s)$ and machine $P_{mt}(x_t|x_s)$.

Intuitively, the $x_s$ with the most biased translations should be the ones with the most skewed empirical conditional distribution. Therefore, the translation bias is measured by calculating the entropy of the empirical conditional distribution, $H(P_e^q(x_t|x_s))$, and selecting the $x_s$ with the lowest entropy. Since the translation space $X_t$ is exponentially large, it is intractable to directly calculate the entropy. Approximate the entropy by adopting one or more approximate strategies, for example, N-best Sequence Entropy and Maximum Confidence Score where N-best Sequence Entropy is:

$$\emptyset_b(x_s) = -\Sigma_{\hat{x}_t \in N} \hat{P}_e^q(\hat{x}_t|x_s) \log \hat{P}_e^q(\hat{x}_t|x_s) \qquad \text{Equation (7)}$$

where $N = \{\hat{x}_t^1, \ldots, \hat{x}_t^N\}$ are the N-best hypothesis sampled from the empirical distribution $P_e^q(x_t|x_s)$. In Equation (7), $\log \hat{P}_e^q(\hat{x}_t|x_s)$ is re-normalized from $P_e^q(\hat{x}_t|x_s)$ over N, which is only a subset of $X_t$, and where Maximum Confidence score (MCS) is:

$$\emptyset_b(x_s) = \log P_e^q(x_t'|x_s) \qquad \text{Equation (8)}$$

such that $$x_t' = \arg\max_{x_t} P_e^q(x_t|x_s) \qquad \text{Equation (9)}$$

Distillation training is used to train the translation model that estimates $P_e^q(x_t|x_s)$ on all the multilingual pairs $(x_s, x_t)$ in the MSP training data $D_q$.

Apply a Bayesian factorization trick that factorizes:

$$P_e^q(x_t|x_s) = \Sigma_{y \in Y} P_e^q(x_t|y) P_e^q(y|x_s), \qquad \text{Equation (10)}$$

where y ranges over LFs representing the semantics. As there is a deterministic mapping between $x_s$ and the LF, $P_e^q(y|x_s)$ is a one-hot distribution. So, the entropy $H(P_e^q(x_t|y)$ is the only term needed to estimate. That is, the less diversified data has less lexically diversified utterances per each LF. In case factorization is used, all $x_s$ that share the same LF have the same scores.

In some implementations, a Bidirectional Encoder Representations from Transformers—Long Short Term Memory (BERT-LSTM) language model is used to estimate $P_e^q(X_t|x_s)$ or $P_e^q(x_t|y)$. BERT-LSTM is a lightweight Seq2Seq model with a copy mechanism that applies BERT-base as the encoder and LSTM as the decoder. Whenever a new source utterance $x_s$ is selected, $P_e^q(x_t|x_s)$ should be re-estimated. In order to reduce the training cost, the ABE method 400 re-estimates $P_e^q(x_t|x_s)$ once at the beginning of each selection round.

With respect to the translation error acquisition function 420, a translation error is measured by leveraging back-translations based on the fact that if the translation quality for one source utterance $x_s$ is good enough, the multilingual semantic parser 330 should be confident in the LF of the source utterance conditioned on its back-translations. Therefore, the translation error for each $x_s$ is measured as the expected multilingual semantic parser's negative log-likelihood in its corresponding LF $y_{x_s}$ over all the back-translations of $x_s$:

$$\mathbb{E}_{P_o^q(x_t|x_s)}[-\log(P_\theta^q( \, \mathcal{Y}_{x_s}|g_{t \to s}^{mt}(x_t)))] \quad \text{Equation (11)}$$

where $P_\theta^q$ the multilingual semantic parser 330 trained at the $q^{th}$ round. To approximate the expectation, two strategies namely N-best Sequence Expected Error and Maximum Error are applied, where N-best Sequence Expected Error is:

$$\phi_b(x_s) = -\sum\nolimits_{\hat{x}_t \in Ny_{x_s}} \hat{P}_e^q(\hat{x}_t|x_s) \log P_\theta(y_{x_s}|g_{t \to s}^{mt}(x_t)) \quad \text{Equation (12)}$$

where $Ny_{x_s}$ is the set of translations in $D^q$ that share the same LF $y_{x_s}$ with $x_s$. To reduce the cost of back-translations, only utterances in $D^q$ are back-translated, and where Maximum Error is:

$$\phi_e(x_s) = -\log P_e^q(y_{x_s}|g_{t \to s}^{mt}(x'_t)) \quad \text{Equation (13)}$$

such that $$x'_t = \arg\max_{x_t} P_e^q (x_t | x_s) \quad \text{Equation (14)}$$

where similar to translation bias, the distillation translation model is used to estimate $P_e^q(x_t|x_s)$ on all the multilingual pairs $(x_s, x_t)$ in the MSP training data $D_q$.

With respect to the semantic density acquisition function 430, since the most representative examples improve the model performance the most, the system 300 and AME method 400 reduces the translation error and bias for the translations of the most representative source utterances. The utterances should be selected from the dense regions in the semantic space defined as:

$$\phi_s(x_s) = \log P(x_s) \quad \text{Equation (15)}$$

In some implementations, kernel density estimation with the exponential kernel is used to estimate $P(x_s)$. In some implementations, other density estimation methods could be also used. The feature representation of $x_s$ for density estimation is the average pooling of the contextual sequence representations from an encoder in the MSP. The density model is re-estimated at the beginning of each query selection round.

The semantic diversity acquisition function 440 provides two functions. The semantic diversity acquisition function 440 prevents the active learning HAT method (described in FIG. 5) from selecting similar utterances. Resolving the bias and errors of similar utterances in a small semantic region does not resolve, by itself, the training issues for the overall training dataset. The semantic diversity acquisition function 440 also correlates with lexical diversity. That is, improving semantic diversity also enriches lexical diversity. The semantic diversity acquisition function 440 can be expressed as:

$$\phi_d(x_s) = \begin{cases} 0, \text{ if } c(x_s) \notin \bigcup\nolimits_{x_s^i \in S} c(x_s^i) \\ -\infty, \text{ Otherwise} \end{cases} \quad \text{Equation (16)}$$

where $c(x_s)$ maps each utterance $x_s$ into a cluster ID and $S$ is the set of cluster IDs of the selected utterances. Any clustering algorithm, e.g., K-means clustering, can be used to diversify the selected utterances. The source utterances are partitioned into $|C|$ clusters. At most one utterance from each cluster is selected. Here, the number of clusters should be greater than or equal to the total budget size until the current selection round, $|C| \geq \sum_{i=1}^q K_i$. The clusters are re-estimated every round. To ensure the optimal exploration of semantic spaces across different query rounds, an incremental K-means clustering algorithm is adopted. At each new round, incremental K-means considers the selected utterances as the fixed cluster centers, and learn the new clusters conditioned on the fixed centers.

The four acquisition functions are aggregated for the final scoring as:

$$\phi_A(x_s) = \sum\nolimits_k \propto_k \phi_k(x_s) \quad \text{Equation (17)}$$

where $\propto_k$'s are the coefficients. Each $\phi_k(x_s)$ is normalized using quantile normalization. Two types of aggregations namely ABE(N-BEST) and ABE(MAX) are used as approximation strategies. ABE(N-BEST) applies N-Best Sequence Entropy and N-Best Sequence Expected Error whereas ABE(MAX) applies Maximum Confidence Score and Maximum Error.

Hyperparameter tuning involves copying configurations from comparable settings or evaluating algorithms on seed data. However, seed (target) data annotation is costly. Selected examples help the parser to generalize well in parsing source-language utterances, and their translations should benefit the parser in parsing target languages. One or more hyperparameter tuning can be accomplished without any target language annotation. The disclosed embodiment acquires different sets of source-language samples with varying hyperparameter configurations, trains the parser on each subset, and evaluates the parser on the source-language utterances. The configurations of the hyperparameters with the best set performance resulting from source-language utterances are chosen for hypermeter tuning. In such a case, the hyperparameters are tuned on the source-language data without any target-language annotation.

Figure 5:
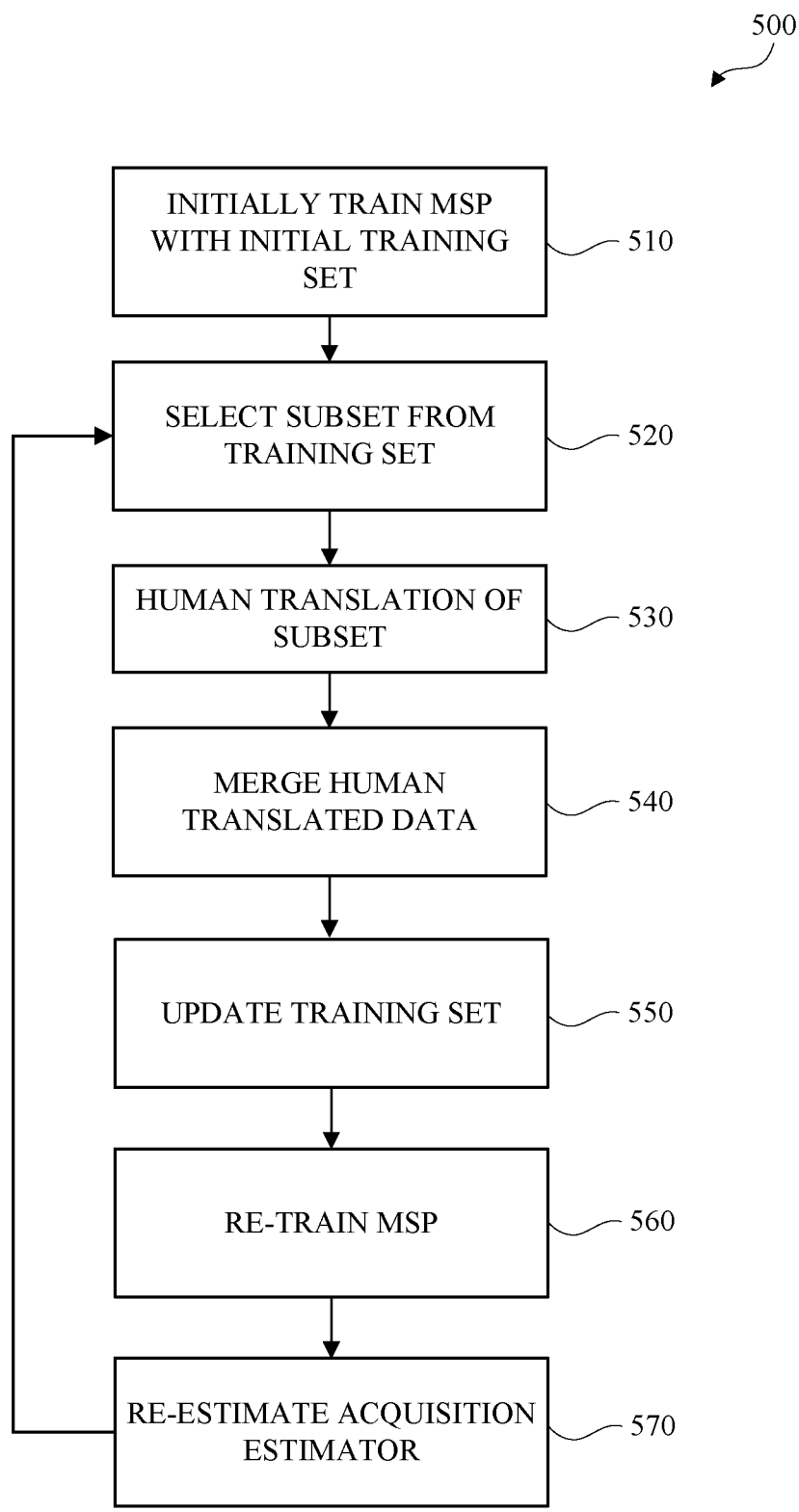
FIG. 5 is a flow chart of active learning in accordance with embodiments of this disclosure.

Reference is now also made to FIG. 5, which is a flow chart of the active learning HAT method 500 in accordance with embodiments of this disclosure.

As noted, there are Q rounds of selection in the active learning HAT method 500. That is, the active learning HAT method 500 is an iterative process. At the $q^{th}$ round, the active learning HAT method 500 selects utterances with a budget size of $K_q$. The active learning HAT method 500 starts with an empty set of human-translated data and an estimation of the acquisition function $\phi(\cdot)$. The iterative active learning HAT method starts by training an initial multilingual semantic parser 330 with initial training dataset 310 (i.e., step 335 in FIG. 3) (510).

A subset $\hat{D}_s^q \in Ds$ is selected of size $K_q$ with the highest scores ranked by the acquisition function $\phi(\cdot)$ (i.e., step 350 in FIG. 3) (520). The utterances in $\hat{D}_s^q$ are translated into the target language $l_t$ (i.e., step 355 in FIG. 3) by human annotators (i.e., step 360 in FIG. 3) (530). The human-translated data is merged together (540). The training dataset is updated (i.e., step 365 in FIG. 3) by adding the human-translated data with the translated source utterances (i.e., into the target language) (i.e., step 320 in FIG. 3) (550). The multilingual semantic parser 330 is re-trained using the updated training set (i.e., step 370 in FIG. 3) (560). The acquisition function ϕ(■) is re-estimated by the acquisition functions estimator 340 (570). The selection process and processing thereafter are repeated for Q rounds. A trained HAT model is output after Q rounds are complete (i.e., step 375 in FIG. 3).

Described herein is a computer-implemented method for training a multilingual semantic parser. The method includes receiving a multilingual dataset comprising pairs of utterances and meaning representations derived from data from one or more high-resource languages and data from one or more low-resource languages. The method further includes processing of training a multilingual semantic parser which includes translation of multilingual utterances into the target language and training the multilingual semantic parser. The method further includes processing of translating multilingual utterance in a multilingual semantic parser, where the processing of translating multilingual utterances includes translation of utterances translates the high resource language into a plurality of low resource languages. The method further includes processing of translating high resource language utterness in a multilingual semantic parser, where the processing of translating multilingual utterances involves the generation of machine-translated and human-translated utterances. The method further includes processing of human-translating high resource multilingual utterness in a multilingual semantic parser, where the processing of human-translating high resource multilingual utterances includes selective identification of utterances for human translation by performing active learning.

In implementations, the multilingual dataset comprises a combination of high resource-low resource corpus with a small subset of the high-resource language data. In implementations, training multimodal semantic parser involves translation from the high resource language(s) into one or more low resource languages. In implementations, the translation of multilingual utterances includes at least two or more human and automatic machine translations. In implementations, identification of high resources multilingual utterances for human translation further comprising computing scores for utterances and determining top-N scored high resource utterness for human translation. In implementations, scoring high resource utterances, further comprising generating of one or more acquisition functions that are combined to score utterances in the source language for translation. In implementations, the acquisition functions further comprising identifying of utterances for human translation comprising computation of one or more parameters of acquisition functions related to translation bias, translation error, semantic diversity, and semantic density. In implementations, the translation bias score attributes to the lexically diversified nature of utterances. In implementations, the translation error score attributes to the portion of the mistranslation of utterances. In implementations, the semantic diversity score attributes to the semantically diversified nature of utterances. In implementations, the semantic density score attributed to a most representative of the utterances' domain of discourse. In implementations, the individual acquisition functions are linearly combined into an aggregated acquisition function with normalizing coefficients. In implementations, the translation bias score measures the lexical diversity of utterances, providing how "human-like" the generated training set is relative to a human-generated test set in the target low-resource language. In implementations, the translation error computation further comprising computing the amount of backtranslation of the utterances in the low-resource language back into the high-resource language using a machine translation system; and scoring back-translated utterances by multiple humans for the percentage that are not semantically equivalent to the original utterances. In implementations, the semantic diversity computation further comprising creating a set of utterance clusters using at least one or more clustering techniques, wherein each cluster comprises semantically similar utterances and constructing of feature representations using the encoder of the multilingual semantic parser. In implementations, the semantic density computation further comprising selecting one of utterances from the dense regions of the semantic space for each cluster based on estimations of the log probabilities of meaning representations. In implementations, the selection of one representative utterance from each identified cluster for human translation.

Described herein are methods, devices and systems for training a multilingual semantic parser. The method includes receiving, by a multilingual semantic parser, a multilingual training dataset, wherein the multilingual training dataset includes pairs of utterances and meaning representations from at least one high-resource language and at least one low-resource language and wherein the multilingual training dataset is initially a machine-translated dataset, training, the multilingual semantic parser, by translating the utterances in the multilingual training dataset to a target language and iteratively performing: selecting, by an acquisition functions estimator, a subset of the multilingual training dataset for human translation, updating the multilingual training dataset with a human-translated subset of the multilingual training dataset, and retraining, the multilingual semantic parser, with the updated multilingual training dataset, where scores, which are used to select the subset, for each of the utterances in the multilingual training dataset or the updated multilingual training dataset are based on a translation bias score, a translation error score, a semantic diversity score, and a semantic density score. In implementations, the tuned one or more hyperparameters enhance a generalization capability of the multilingual semantic parser to parse source-language utterances.

Described herein are methods, devices and systems for training a multilingual semantic parser. A multilanguage semantic parser apparatus includes a processor; and a memory storing instructions that, when executed by the processor, configure the multilanguage semantic parser apparatus to: receive a multilingual training dataset, wherein the multilingual training dataset includes pairs of utterances and meaning representations from at least one high-resource language and at least one low-resource language and wherein the multilingual training dataset is initially a machine-translated dataset, train a multilanguage semantic parser by translating the utterances in the multilingual training dataset to a target language; and iteratively perform: select a subset of the multilingual training dataset for human translation, update the multilingual training dataset with a human-translated subset of the multilingual training dataset; and retrain the multilanguage semantic parser with the updated multilingual training dataset, where scores, which are used to select the subset, for each of the utterances in the multilingual training dataset or the updated multilingual training dataset are based on a translation bias score, a translation error score, a semantic diversity score, and a semantic density score.

While the embodiments described herein may be susceptible to various modifications and alternative forms, specific embodiments thereof are shown by way of example in the drawings and will be described in detail below. It should be understood, however that these examples not intended to limit the embodiments to the particular forms disclosed, but on the contrary, the disclosed embodiments cover all modifications, equivalents, and alternatives falling within the spirit and the scope of the disclosure as defined by the appended claims.

The method steps have been represented, wherever appropriate, by conventional symbols in the drawings, showing those specific details that are pertinent to understanding the embodiments so as not to obscure the disclosure with details that will be readily apparent to those of ordinary skill in the art having benefit of the description herein.

The terms "comprises," "comprising," or any other variations thereof, are intended to cover a non-exclusive inclusion, such that a process, method that comprises a list of steps does not include only those steps but may include other steps not expressly listed or inherent to such process or method. Similarly, one or more elements in a system or apparatus proceeded by "comprises . . . a" does not, without more constraints, preclude the existence of other elements or additional elements in the system or apparatus.

The features of the present embodiments are set forth with particularity in the appended claims. Each embodiment itself, together with further features and attended advantages, will become apparent from consideration of the following detailed description, taken in conjunction with the accompanying drawings.

Having described and illustrated the principles with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the described embodiments shown in software may be implemented in hardware and vice versa. As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine-readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted, or otherwise processed in a suitable manner if necessary, and then stored in a computer memory. Modules can be defined by executable code stored on non-transient media.

The following description is presented to enable a person of ordinary skill in the art to make and use the embodiments and is provided in the context of the requirement for a obtaining a patent. The present description is the best presently-contemplated method for carrying out the present embodiments. Various modifications to the embodiments will be readily apparent to those skilled in the art and the generic principles of the present embodiments may be applied to other embodiments, and some features of the present embodiments may be used without the corresponding use of other features. Accordingly, the present embodiments are not intended to be limited to the embodiments shown but are to be accorded the widest scope consistent with the principles and features described herein.

What is claimed is:

1. A method for training a multilingual semantic parser, the method comprising:
   receiving, by a multilingual semantic parser, a multilingual training dataset, wherein the multilingual training dataset includes pairs of utterances and meaning representations from at least one high-resource language and at least one low-resource language and wherein the multilingual training dataset is initially a machine-translated dataset;
   training, the multilingual semantic parser, by translating the utterances in the multilingual training dataset to a target language; and
   iteratively performing:
      selecting, by an acquisition functions estimator, a subset of the multilingual training dataset for human translation;
      updating the multilingual training dataset with a human-translated subset of the multilingual training dataset; and
      retraining, the multilingual semantic parser, with the updated multilingual training dataset,
      wherein scores, which are used to select the subset, for each of the utterances in the multilingual training dataset or the updated multilingual training dataset are based on a translation bias score, a translation error score, a semantic diversity score, and a semantic density score.

2. The method of claim 1, wherein the utterances are translated from the at least one high-resource language into a plurality of low-resource languages.

3. The method of claim 1, wherein the translation of multilingual utterances includes at least two or more human and automatic machine translations.

4. The method of claim 1, wherein the selecting further comprising:
   computing, by the acquisition functions estimator, score for each of the utterances in the multilingual training dataset or the updated multilingual training dataset and determining top-N scored high resource utterances for human translation.

5. The method for claim 4, wherein the computing further comprising:
   generating, by the acquisition functions estimator, one or more acquisition function scores that are combined to score the utterances.

6. The method of claim 5, wherein the one or more acquisition functions are linearly combined into an aggregated acquisition function with normalizing coefficients.

7. The method of claim 5, wherein the one or more acquisition function scores include the translation bias score, the translation error score, the semantic diversity score, and the semantic density score.

8. The method of claim 7, wherein the translation bias score indicates a lexically diversified nature of the utterances.

9. The method of claim 8, further comprising:
tuning, by the multilingual semantic parser, one or more hyperparameters by selecting configurations from best source-language samples.

10. The method of claim 9, wherein the tuned one or more hyperparameters enhance a generalization capability of the multilingual semantic parser to parse source-language utterances.

11. The method of claim 8, wherein the translation error score indicates a portion of the utterances that are mistranslated.

12. The method for claim 11, wherein a translation error computation further comprising:
computing, by the acquisition functions estimator, an amount of backtranslation of the utterances in a low-resource language back into a high-resource language using a machine translation system; and
scoring, by the acquisition functions estimator, back-translated utterances for a percentage that are not semantically equivalent to the utterances.

13. The method of claim 11, wherein the semantic diversity score indicates a semantically diversified nature of the utterances.

14. The method for claim 13, wherein a semantic diversity computation further comprising:
creating, by the acquisition functions estimator, a set of utterance clusters using at least one or more clustering techniques, wherein each cluster comprises semantically similar utterances; and
constructing, by the acquisition functions estimator, feature representations using the multilingual semantic parser.

15. The method of claim 14, wherein the semantic density score indicates a most representative utterance of an utterances' domain of discourse.

16. The method for claim 15, wherein a semantic density computation further comprising:
selecting, by the acquisition functions estimator, one of the utterances from dense regions of a semantic space for each cluster based on estimations of log probabilities of the meaning representations.

17. The method of claim 16, wherein the selection is of one representative utterance from each identified cluster for human translation.

18. A multilanguage semantic parser apparatus, comprising:
a processor; and
a memory storing instructions that, when executed by the processor, configure the multilanguage semantic parser apparatus to:
receive a multilingual training dataset, wherein the multilingual training dataset includes pairs of utterances and meaning representations from at least one high-resource language and at least one low-resource language and wherein the multilingual training dataset is initially a machine-translated dataset;
train a multilanguage semantic parser by translating the utterances in the multilingual training dataset to a target language; and
iteratively perform:
select a subset of the multilingual training dataset for human translation;
update the multilingual training dataset with a human-translated subset of the multilingual training dataset; and
retrain the multilanguage semantic parser with the updated multilingual training dataset,
wherein scores, which are used to select the subset, for each of the utterances in the multilingual training dataset or the updated multilingual training dataset are based on a translation bias score, a translation error score, a semantic diversity score, and a semantic density score.

19. The apparatus of claim 18, wherein the memory storing instructions that, when executed by the processor, further configure the multilanguage semantic parser apparatus to:
compute a score for each of the utterances in the multilingual training dataset or the updated multilingual training dataset and determine top-N scored high resource utterances for human translation.

20. The apparatus of claim 19, wherein the memory storing instructions that, when executed by the processor, further configure the multilanguage semantic parser apparatus to:
generate one or more acquisition function scores that are combined to score the utterances.

21. The apparatus of claim 20, wherein the one or more acquisition function scores include the translation bias score, the translation error score, the semantic diversity score, and the semantic density score.

22. The apparatus of claim 21, wherein the translation bias score indicates a lexically diversified nature of the utterances, wherein the translation error score indicates a portion of the utterances that are mistranslated, wherein the semantic diversity score indicates a semantically diversified nature of the utterances, and wherein the semantic density score indicates a most representative utterance of an utterances' domain of discourse.

* * * * *